Patented July 31, 1928.

1,679,322

UNITED STATES PATENT OFFICE.

JAMES McINTOSH, OF NORRISTOWN, PENNSYLVANIA, ASSIGNOR TO DIAMOND STATE FIBRE COMPANY, OF ELSMERE, DELAWARE, A CORPORATION OF DELAWARE.

SYNTHETIC RESIN AND METHOD OF MAKING SAME.

No Drawing. Application filed April 4, 1922. Serial No. 549,522.

My invention relates to that class of condensation products utilizing phenol or one of its homologues as one of its ingredients in the preparation of resinous products and one object of said invention is to provide a new condensation product to be used as a synthetic resin which in its production shall employ oils having aldehyde bases.

It is desired to provide a synthetic resin which shall be inexpensive and easy to make, whose nature shall be such as to fit it for use as a shellac substitute, as a molding compound, as a waterproofing agent for impregnating sheet, tube and rod material made of paper, woven or felted fabric, or, parchmentized fibre and for any other uses requiring a hard, relatively infusible, insoluble and structurally strong substance which is light and tough.

Another object of the invention is to provide a synthetic resin of the above class which shall be available for use as a nonconductor of high dielectric value, which shall be water- and oil proof, and which may be prepared in soluble or in insoluble form at will, being when in soluble form, capable of further treatment whereby it may be changed into its insoluble and infusible form.

I also desire to provide a condensation product which in its initial stage may be utilized in connection with suitable powdered or fibrous material as a substance from which articles may be molded and subsquently subjected to heat and pressure in order to transform said product therein into its final solid, infusible, insoluble form.

It is further desired to provide a relatively simple, inexpensive and conveniently operative process utilizing such oils as cinnamon oil, oil of cassia, vanillin, etc. for making products of the above class.

In carrying out my invention, in a typical case I mix one hundred grams of oil of cassia with two hundred grams of phenol or one of its homologues, adding if desired, though not necessarily, two to five grams of sulphuric or hydrochloric acid as a catalyzer. This mixture is then digested in a reflux condenser for about two hours and distilled under vacuum for one hour to remove uncombined phenol. The resulting product is a shiny, hard, black, sweet-smelling, resinous material adapted for use as a varnish or shellac substitute, which will soften at 212° F. and flow at about 260° F., being soluble in alcohol, acetone, benzol, etc.

If 5% to 10% of a hardening agent such as hexamethylenetetramine, or an ammonium salt of furfurol be added to the above condensation product, which is then in its intermediate state, and the whole be heated to a temperature of about 200° F. for example, for from one to two hours, the initial product will change to its insoluble, infusible form. In either its initial or in its final forms, the above condensation product of a phenolic body and an essential oil may be employed for any of the purposes for which other similar phenolic condensation products are now utilized. When in its initial stage, it may be employed as a base in the manufacture of varnish, it may be used for the impregnation of vulcanized fibre, paper or fabrics in sheet, tube, block or rod form, after which upon the application of suitable heat for example 325° F. and a pressure of about one thousand pounds to the square inch, for from one to five hours or more, depending upon the dimensions and form of the structure, it may be caused to change to its final or solid infusible form.

In making a laminated structure such as a block, sheet, tube or rod, the above condensation product in its liquid or semi-solid, initial stage, is dissolved in from fifty to sixty parts of an organic solvent such as alcohol or acetone and is caused to uniformly permeate the sheet or other fibrous or porous body, either by directly soaking the latter in the liquid or by any other available method. After the solvent has been removed as by heating in an oven or dry house, the impregnated sheets or other structures may be subjected to relatively high pressure such as one thousand pounds to the square inch and heated to a temperature of about 325° F. for a period depending upon the thickness and dimensions of said material, with the result that the condensation product therein is changed to its final, insoluble, infusible form. Tubes or rods may be made from the above described impregnated sheet material by winding it on a mandrel and thereafter subjecting it to heat and pressure such as above indicated.

In any case the resulting product is unaffected by moisture and by the ordinary organic solvents, it has a high mechanical strength and is especially adapted for mechanical and electric purposes, being particularly useful for the manufacture of gears, electrical insulators, phonograph records, etc. Without departing from my invention I may vary the proportions of the oil and of the phenolic body employed therewith. I may also vary the temperatures, pressures, and time of treatment,—the essential feature of the invention residing in the production of a condensation product constituting a synthetic resin or resin by utilizing a phenolic body and an oil having an aldehyde base as described above. In place of phenol I may employ any of its homologues.

While the condensation product in its initial form may be liquid, semi-solid, or solid and soluble in acetone, alcohol, benzol, etc., in its final form it is influsible and insoluble in the ordinary organic solvents, being a hard, tough resinous substance of dark color, breaking with a lustrous fracture and having a dense, homogeneous structure.

If desired, the catalytic agent employed may be removed by washing it out by water or other suitable solvent, in which the condensation product is insoluble. This removal by a purely physical method is best performed while said product is in its initial stage. If the use of water or other solvent is not desirable, the catalytic agent may be removed by chemical means, i. e., by introducing some substance such as barium oxide, which will react exclusively with the catalyst to form an inert or unobjectionable substance not affecting the desired properties of the condensation product.

When in its initial stage the above described condensation product may be dissolved in alcohol, acetone, benzine, etc. and thereafter mixed with wood flour, asbestos or other organic or inorganic material, the solvent being then removed by heat. The resulting mass may be ground or otherwise reduced to a powder capable of being readily given any desired form by subjecting it in a suitable mold to proper temperature and pressure for a period of time necessary to cause the condensation product to assume its final infusible, insoluble form.

I claim:

1. The process of forming a potentially reactive resin which comprises causing a phenolic body and an essential oil having an aldehyde base to react to form a fusible, soluble non-crystalline condensation product capable of transformation into a hard, infusible product upon further heating.

2. The process which comprises causing a phenolic body and an essential oil having an aldehyde base to react to form an initial condensation product, and thereafter heating the same to form a hard, infusible, insoluble synthetic resin.

3. The process of forming a potentially reactive resin which comprises heating together a phenolic body, an essential oil having an aldehyde base and a condensation reaction catalyst until there is formed a fusible, soluble non-crystalline condensation product capable of transformation into a hard, infusible product upon further heating.

4. The process which comprises heating together a phenolic body, an essential oil having an aldehyde base and a condensation reaction catalyst until there is formed a fusible, soluble condensation product, and further heating the same to form a hard, infusible, insoluble synthetic resin.

5. A hard, infusible synthetic resin resulting from the further heating of the initial condensation product obtained by reacting a phenolic body and an essential oil having an aldehyde base.

6. An initial non-crystalline condensation product resulting from the reaction of a phenolic body and an essential oil having an aldehyde base consisting of a compound soluble in alcohol, acetone and benzol and capable of being rendered infusible and insoluble by heating.

7. The process of forming a potentially reactive resin which comprises causing a phenolic body and an essential oil having an aldehyde base to react to form a fusible, soluble non-crystalline condensation product, and adding thereto a hardening agent capable of transformation into a hard, infusible product upon further heating.

8. The process which comprises causing a phenolic body and an essential oil having an aldehyde base to react to form an initial condensation product, adding thereto a hardening agent, and then further heating the same to obtain a hard, infusible, insoluble resin.

9. The process which comprises heating together a phenolic body, an essential oil having an aldehyde base and a condensation reaction catalyst until there is formed a fusible, soluble condensation product, adding a hardening agent thereto, and further heating the same to form a hard, infusible, insoluble resin.

10. The process which comprises causing a phenolic body and an essential oil having an aldehyde base to react to form an initial condensation product, adding thereto hexamethylenetetramine, and then further heating the same to obtain a hard, infusible, insoluble resin.

11. The process which comprises heating together a phenolic body, an essential oil having an aldehyde base and a condensation reaction catalyst until there is formed a fusible, soluble condensation product, adding hexamethylenetetramine thereto, and further heating the same to form a hard, infusible, insoluble resin.

12. A potentially reactive resinous body capable of transformation into a hard, infusible, insoluble body upon further heating resulting from the admixture of a hardening agent and the initial non-crystalline condensation product obtained by reacting a phenolic body with an essential oil having an aldehyde base.

13. A hard, infusible, insoluble synthetic resin resulting from the further heating of the initial condensation product obtained by reacting a phenolic body and an essential oil having an aldehyde base, with a hardening agent.

14. A hard, infusible, insoluble synthetic resin resulting from the further heating of the initial condensation product obtained by reacting a phenolic body and an essential oil having an aldehyde base, with hexamethylenetetramine.

JAMES McINTOSH.